(12) United States Patent
Watson et al.

(10) Patent No.: US 8,189,854 B2
(45) Date of Patent: May 29, 2012

(54) WATERMARKING AND FINGERPRINTING DIGITAL CONTENT USING ALTERNATIVE BLOCKS TO EMBED INFORMATION

(75) Inventors: Stephen Watson, Toronto (CA); Daniel A. Collens, Waterloo (CA); Kevin Hui, Kitchener (CA); Michael A. Malcolm, Aspen, CO (US)

(73) Assignee: Kaleidescape, Inc., Sunnyvale, CA (US)

( * ) Notice: Subject to any disclaimer, the term of this patent is extended or adjusted under 35 U.S.C. 154(b) by 1335 days.

(21) Appl. No.: 11/707,634

(22) Filed: Feb. 16, 2007

(65) Prior Publication Data

US 2007/0242862 A1    Oct. 18, 2007

Related U.S. Application Data

(63) Continuation of application No. 11/261,442, filed on Oct. 28, 2005, now Pat. No. 7,181,044, which is a continuation of application No. 10/356,322, filed on Jan. 31, 2003, now Pat. No. 7,003,131.

(60) Provisional application No. 60/394,630, filed on Jul. 9, 2002, provisional application No. 60/394,922, filed on Jul. 9, 2002, provisional application No. 60/394,588, filed on Jul. 9, 2002.

(51) Int. Cl.
*G06K 9/00* (2006.01)

(52) U.S. Cl. ........ 382/100; 382/232; 382/240; 713/176; 713/179

(58) Field of Classification Search ................. 382/100, 382/232, 240; 713/176, 179
See application file for complete search history.

(56) References Cited

U.S. PATENT DOCUMENTS

| | | | | |
|---|---|---|---|---|
| 4,502,937 A | * | 3/1985 | Yagi | .............................. 204/406 |
| 4,792,226 A | * | 12/1988 | Fishbine et al. | ................. 356/71 |
| 4,992,940 A | | 2/1991 | Dworkin | |
| 5,335,277 A | | 8/1994 | Harvey et al. | |
| 5,337,357 A | | 8/1994 | Chou et al. | |
| 5,410,415 A | | 4/1995 | Parulski et al. | |

(Continued)

FOREIGN PATENT DOCUMENTS

EP     1 199 647 A2     4/2002

(Continued)

OTHER PUBLICATIONS

Dittman. "Combining digital watermarks and collusion secure fingerprints for customer copy monitoring." Secure Images and Image Authentication, The Institution of Electrical Engineers, 2000, pp. 1-6, IEE London.

(Continued)

*Primary Examiner* — Yosef Kassa

(57) ABSTRACT

A method of embedding information in digital content representing media streams. The method includes (1) selecting a set of locations within that digital content representing the media stream to embed information, (2) selecting a set of possible alterations to make at those locations, and (3) making a subset of the possible alterations. The set of locations and possible alterations is herein sometimes called a "watermark." The subset of actual alterations that are made is herein sometimes called a "fingerprint." The method determines a set of locations at which there are alternative versions of digital content representing the same media stream, such as one being the original and one being an alternative version of the same digital content, herein sometimes called the "original movie" and the "alt-movie," or herein sometimes called the "original block" and the "alt-block" for a particular block in the digital content representing the media stream.

20 Claims, 6 Drawing Sheets

U.S. PATENT DOCUMENTS

| | | | |
|---|---|---|---|
| 5,724,327 | A | 3/1998 | Timmermans et al. |
| 5,734,752 | A | 3/1998 | Knox |
| 5,765,176 | A | 6/1998 | Bloomberg |
| 5,809,139 | A | 9/1998 | Girod et al. |
| 5,896,454 | A | 4/1999 | Cookson et al. |
| 5,905,800 | A | 5/1999 | Moskowitz et al. |
| 5,946,665 | A | 8/1999 | Suzuki et al. |
| 6,009,525 | A | 12/1999 | Horstmann |
| 6,182,069 | B1 | 1/2001 | Niblack et al. |
| 6,188,728 | B1 | 2/2001 | Hurst |
| 6,192,139 | B1 | 2/2001 | Tao |
| 6,208,745 | B1 | 3/2001 | Florenco et al. |
| 6,209,092 | B1 | 3/2001 | Linnartz |
| 6,229,924 | B1 | 5/2001 | Rhoads et al. |
| 6,260,024 | B1 | 7/2001 | Shkedy |
| 6,320,829 | B1 | 11/2001 | Matsumoto et al. |
| 6,363,488 | B1 | 3/2002 | Ginter et al. |
| 6,366,910 | B1 | 4/2002 | Rajaraman et al. |
| 6,373,960 | B1 | 4/2002 | Conover et al. |
| 6,374,036 | B1 | 4/2002 | Ryan et al. |
| 6,411,725 | B1 | 6/2002 | Rhoads |
| 6,463,426 | B1 | 10/2002 | Lipson et al. |
| 6,463,431 | B1 | 10/2002 | Schmitt |
| 6,467,867 | B1 * | 10/2002 | Worthington et al. .......... 347/19 |
| 6,563,935 | B1 | 5/2003 | Echizen et al. |
| 6,574,609 | B1 | 6/2003 | Downs et al. |
| 6,614,914 | B1 | 9/2003 | Rhoads et al. |
| 6,625,581 | B1 | 9/2003 | Perkowski |
| 6,629,097 | B1 | 9/2003 | Keith |
| 6,633,653 | B1 | 10/2003 | Hobson et al. |
| 6,642,939 | B1 | 11/2003 | Vallone et al. |
| 6,694,041 | B1 | 2/2004 | Brunk |
| 6,700,990 | B1 | 3/2004 | Rhoads |
| 6,714,683 | B1 | 3/2004 | Tian et al. |
| 6,728,213 | B1 | 4/2004 | Tzeng et al. |
| 6,850,252 | B1 * | 2/2005 | Hoffberg ...................... 715/716 |
| 6,889,383 | B1 | 5/2005 | Jarman |
| 6,971,013 | B2 | 11/2005 | Mihcak et al. |
| 7,003,131 | B2 | 2/2006 | Watson et al. |
| 7,032,177 | B2 | 4/2006 | Novak et al. |
| 7,036,024 | B2 | 4/2006 | Watson |
| 7,072,496 | B2 * | 7/2006 | Lo et al. ................... 382/124 |
| 7,099,491 | B2 | 8/2006 | Takaku |
| 7,111,168 | B2 * | 9/2006 | Lofgren et al. ............... 713/176 |
| 7,111,171 | B2 | 9/2006 | Collens et al. |
| 7,120,297 | B2 * | 10/2006 | Simard et al. ................. 382/166 |
| 7,172,115 | B2 * | 2/2007 | Lauden .......................... 235/380 |
| 7,181,044 | B2 | 2/2007 | Watson et al. |
| 7,188,248 | B2 | 3/2007 | Watson |
| 7,231,607 | B2 | 6/2007 | Neely et al. |
| 7,333,001 | B2 * | 2/2008 | Lane et al. ................... 340/10.1 |
| 7,392,395 | B2 * | 6/2008 | Ginter et al. ................... 713/176 |
| 7,494,060 | B2 * | 2/2009 | Zagami ......................... 235/382 |
| 7,526,114 | B2 * | 4/2009 | Xia et al. ..................... 382/128 |
| 2001/0037465 | A1 | 11/2001 | Hart et al. |
| 2001/0051996 | A1 | 12/2001 | Cooper et al. |
| 2002/0085713 | A1 | 7/2002 | Feig et al. |
| 2002/0087876 | A1 | 7/2002 | Larose |
| 2002/0095582 | A1 | 7/2002 | Peled et al. |
| 2002/0116707 | A1 | 8/2002 | Morris et al. |
| 2002/0118299 | A1 | 8/2002 | Kahn |
| 2002/0138741 | A1 | 9/2002 | Koch |
| 2002/0150277 | A1 | 10/2002 | Nishimoto et al. |
| 2002/0172394 | A1 | 11/2002 | Venkatesan et al. |
| 2002/0174021 | A1 | 11/2002 | Chu et al. |
| 2002/0178077 | A1 | 11/2002 | Katz et al. |
| 2002/0196976 | A1 | 12/2002 | Mihcak et al. |
| 2003/0014751 | A1 | 1/2003 | Paek |
| 2003/0030752 | A1 | 2/2003 | Begeja |
| 2003/0081857 | A1 | 5/2003 | Tapson |
| 2003/0107676 | A1 | 6/2003 | Jang |
| 2003/0110503 | A1 | 6/2003 | Perkes |
| 2003/0126599 | A1 | 7/2003 | Novak et al. |
| 2003/0139971 | A1 | 7/2003 | Rescigno et al. |
| 2003/0163430 | A1 | 8/2003 | Takaku |
| 2003/0182297 | A1 | 9/2003 | Murakami et al. |
| 2003/0191738 | A1 | 10/2003 | Hoeye et al. |
| 2004/0008864 | A1 | 1/2004 | Watson et al. |
| 2004/0010692 | A1 | 1/2004 | Watson |
| 2004/0010694 | A1 | 1/2004 | Collens et al. |
| 2004/0088557 | A1 | 5/2004 | Malcolm et al. |
| 2004/0114049 | A1 | 6/2004 | Arora |
| 2004/0136698 | A1 | 7/2004 | Mock |
| 2004/0139064 | A1 | 7/2004 | Chevallier et al. |
| 2004/0166484 | A1 | 8/2004 | Budke |
| 2004/0166915 | A1 | 8/2004 | Robarge |
| 2004/0169683 | A1 | 9/2004 | Chiu et al. |
| 2005/0004873 | A1 | 1/2005 | Pou et al. |
| 2005/0050103 | A1 | 3/2005 | Kesteloot et al. |
| 2005/0086069 | A1 | 4/2005 | Watson et al. |
| 2005/0120053 | A1 | 6/2005 | Watson |
| 2005/0125405 | A1 | 6/2005 | Watson |
| 2005/0154892 | A1 | 7/2005 | Mihcak et al. |
| 2005/0182989 | A1 | 8/2005 | Zarnke et al. |
| 2005/0201726 | A1 | 9/2005 | Malcolm et al. |
| 2007/0106901 | A1 | 5/2007 | Collens et al. |
| 2007/0118812 | A1 | 5/2007 | Kesteloot et al. |

FOREIGN PATENT DOCUMENTS

| | | |
|---|---|---|
| EP | 04700867.7 | 7/2003 |
| JP | 2005-137090 A | 6/1993 |
| JP | 2007-281293 | 10/1995 |
| JP | H11-341450 | 10/1999 |
| JP | 2004-520106 | 7/2003 |
| JP | 2011-040389 | 7/2003 |
| JP | 2005-533410 A | 11/2005 |
| JP | 2005-533416 A | 11/2005 |
| JP | 2006-518063 A | 8/2006 |
| JP | 2006-520944 A | 9/2006 |
| JP | 2011-040389 | 2/2011 |
| WO | 01/19071 | 3/2001 |
| WO | WO 02/075591 A1 | 9/2002 |
| WO | PCT/US2003/021592 | 7/2003 |
| WO | 2004/006168 | 1/2004 |
| WO | WO 2004/006168 A1 | 1/2004 |
| WO | WO 2004/006494 A1 | 1/2004 |
| WO | WO 2004/006559 A2 | 1/2004 |
| WO | WO 2004/006579 A1 | 1/2004 |
| WO | WO 2004/062945 A2 | 7/2004 |
| WO | WO 2004/064293 A2 | 7/2004 |
| WO | WO 2004/070585 A2 | 8/2004 |
| WO | WO 2004/070998 A2 | 8/2004 |
| WO | WO 2005/009024 A2 | 1/2005 |
| WO | WO 2005/079375 A2 | 9/2005 |
| WO | WO 2005/086985 A2 | 9/2005 |
| WO | WO 2006/025833 A1 | 3/2006 |
| WO | WO 2006/055938 A2 | 5/2006 |

OTHER PUBLICATIONS

Fridrich. "Copyright protection of digital images (authentication)." Feb. 18, 2003, http://www.ws.binghamton.edu/fridrich/Research'tutor2.ppt.

Langelaar. "Real-Time Watermarking Techniques for Compressed Video Data." Thesis, Delft University of Technology, 2000, pp. ix-621, Universal Press, Veenendaal.

Rey et al. "A Survey of Watermarking Algorithms for Image Authentication." EURASIP Journal on Applied Processing, 2002, pp. 613-621, vol. 6, Hindawi Publishing Corporation, www.hindawi.co.uk/acces/qet.php?journal=asp&volume=2002&pii=S1110865702204047.

EPO, Communication for Application No. 03763443.3, and corresponding claims, Mar. 24, 2011.

EPO, Supplementary Search Report for Application No. 03763443.3, Nov. 19, 2010.

JPO, Notice of Final Rejection of Application No. 2004-520106 (translation), and corresponding claims, Oct. 26, 2010.

JPO, Notice of Rejection of Application No. 2004-520106 (translation), and corresponding claims, Jan. 19, 2010.

USPTO PCT, International Search Report for Application PCT/US2003/021592, Jan. 15, 2004.

Langelaar et al., "Real-Time Labeling of MPEG-2 Compressed Video", Journal of Visual Communication and Image Representation, vol. 9 No. 4, Dec. 1, 1998, pp. 256-270.

Hartung et al., "Multimedia Watermarking Techniques", Proceedings of the IEEE, vol. 87 No. 7, Jul. 1, 1999.

Hartung et al., "Watermarking of MPEG-2 Encoded Video Without Decoding and Re-encoding", Proceedings of the International Society for Optical Engineering, vol. 3020, Feb. 10, 1999.

* cited by examiner

WATERMARKING AND FINGERPRINTING DIGITAL CONTENT USING ALTERNATIVE BLOCKS TO EMBED INFORMATION

CROSS REFERENCE TO RELATED APPLICATIONS

This application claims priority of the following documents, each of which is hereby incorporated by reference as if fully set forth herein.

U.S. provisional application 60/394,630, filed Jul. 9, 2002, in the name of inventors Michael A Malcolm, Stephen Watson, Daniel A Collens, and Kevin Hui, titled "Watermarking and Fingerprinting a Movie for Secure Distribution."

U.S. provisional application 60/394,922, filed Jul. 9, 2002, in the name of inventors Michael A Malcolm, Stephen Watson, and Daniel A Collens, titled "System Architecture of a System for Secure Distribution of Media."

U.S. provisional application 60/394,588, filed Jul. 9, 2002, in the name of inventors Michael A Malcolm and Daniel A Collens, titled "Topology of Caching Nodes in a System for Secure Delivery of Media Content."

U.S. application Ser. No. 10/356,322, filed Jan. 31, 2003, U.S. Pat. No. 7,003,131, in the name of inventors Stephen Watson, Daniel A. Collens, Kevin Hui, and Michael A. Malcolm, titled "Watermarking and Fingerprinting Digital Content Using Alternative Blocks to Embed Information."

U.S. application Ser. No. 11/261,442, filed Oct. 28, 2005, now allowed, in the name of inventors Stephen Watson, Daniel A. Collens, Kevin Hui, and Michael A. Malcolm, titled "Watermarking and Fingerprinting Digital Content Using Alternative Blocks to Embed Information."

BACKGROUND OF THE INVENTION

1. Field of the Invention

The invention relates to distribution of digital content.

2. Related Art

Distribution of digital content for media streams, such as for example movies, is subject to several problems. One problem is that it is easy to make exact copies of digital content, thus allowing any recipient of that content to redistribute it, whether or not authorized to do so. It would be advantageous to be able to distribute digital content, particularly digital content for media streams, without fear of its unauthorized distribution. This would be particularly advantageous when it is desired to distribute digital content using a communication link, such as for example a computer network or other technique for distribution to end viewers (for example, either on demand, in anticipation of future demand, or in response to something else).

One known solution is to mark the digital content with a "fingerprint," so that an unauthorized redistributor of the content can be identified, thus hopefully deterring potential unauthorized redistributors. However, fingerprinting of digital content is subject to several known problems, including (1) that presentation of the media stream might be degraded by altering the original content, (2) that recipients might attack the fingerprint, either by altering it or erasing it, or (3) that it might be difficult to determine the unauthorized redistributor with sufficient certainty, particularly if multiple unauthorized redistributors collude to make copies in which the fingerprint has been altered or erased using information available to those multiple recipients.

Another problem is that the fingerprint might interfere with distribution, decoding, or presentation of the original media stream. In particular, when the original media stream is encoded using a known format for movies, such as for example the MPEG-2 format, the amount of data included in even a single movie can be quite large. It would be advantageous for any fingerprinting method to retain the structure of the original MPEG encoding (including packetization of the original media stream), so that the particular fingerprinted digital content is not changed for distribution purposes by the fingerprint. In particular, it would be advantageous to assure that (1) the length of the fingerprinted digital content is the same as the length of the original digital content, and (2) sending the fingerprinted digital content can be interrupted and restarted, such as when using network communication techniques, without having to recompute the fingerprinted digital content and without having to maintain large amounts of intermediate state information about the fingerprinted digital content.

SUMMARY OF THE INVENTION

One aspect of the invention is a method of embedding information in a media stream. The method includes (1) selecting a set of locations within that media stream to embed information, (2) selecting a set of possible alterations to make at those locations, and (3) making a subset of the possible alterations. The set of locations and possible alterations is herein sometimes called a "watermark." The subset of actual alterations that are made is herein sometimes called a "fingerprint."

The method determines a set of locations at which there are alternative versions of the same media stream, such as one being the original and one being an alternative version of the same media stream, herein sometimes called the "original movie" and the "alt-movie" ("alternative movie"), or sometimes called the "original block" and the "alt-block" ("alternative block") for a particular block in the media stream. More than one alt-movie or alt-block can be defined for each location in order to permit more than one bit of information to be embedded at each location. Thus, each such location can embed one or more bits of information, the embedded bits being responsive to whether the original movie or the alt-movie (or one of plural alt-movies) is selected for that location.

An aspect of the method includes selecting the alterations so that there is no change in distribution of the media stream, such as for example (1) packetization of the digital content representing that media stream, or (2) synchronization of audio with video portions of the media stream. In a preferred embodiment, unchanged distribution can be accomplished by making no changes in lengths of portions of the digital content representing that media stream, such as for example individual blocks of an MPEG-encoded movie.

In a preferred embodiment, the method includes determining a set of intra-coded blocks in an MPEG-2 encoding of the digital content for that media stream. Each intra-coded block has a set of run-level encoded values for DCT coefficients for that block. The method determines if there is an alternative set of values which differ only a little from the original set of values, and which do not change the bit-length of the encoded block. Each such block thus provides both a location to embed information, and an alteration for that location, and thus provides at least one bit worth of embeddable information. In alternative embodiments, macroblocks may be used instead of blocks.

This preferred embodiment would include the choice of (1) the number of run-level encoded values to be changed in any individual block, such as <=2 values; (2) the amount of alteration, such as +/−1 level, for any run-level encoded values to be changed; and (3) the amount of quantization allowed for any run-level encoded values to be changed, such as a quantization scale <=24.

In a preferred embodiment, the method includes noting those blocks at which an alt-block can be selected, and selecting the particular alt-block at each block in response to a random or pseudorandom effect. This type of effect may help a fingerprint resist attacks that attempt to study the run-level codes in order to "undo" the fingerprint. It may also help to spread the watermarking over a relatively large range of spatial frequencies of the content, further diminishing visible effects while also helping to resist attacks. Thus, for each movie that is watermarked, the particular alt-movie by which it is watermarked is resistant to attacks that might involve attempting to reverse the embedding of information by re-encoding alt-blocks into original blocks or re-encoding blocks into alt-blocks, because the selection of those alt-blocks or those original blocks is not easily known to the attacker.

The method of the preferred embodiment also excludes blocks at locations that span packet boundaries within a packetized data stream for the digital content representing the media stream. Alt-blocks preferably are not selected for such spanning blocks because accessing those blocks would involve parsing of the packetized digital content, possibly involving non-trivial look-ahead and analysis of the digital content representing the media stream. Thus, this optimization simplifies implementation of the preferred embodiment of the invention.

The invention is not restricted to movies, but is also applicable to other digital content and other media streams, such as for example animation or sound, as well as to still media, such as for example pictures or illustrations, and to databases and other collections of information.

DETAILED DESCRIPTION OF THE PREFERRED EMBODIMENT

Figure 1:
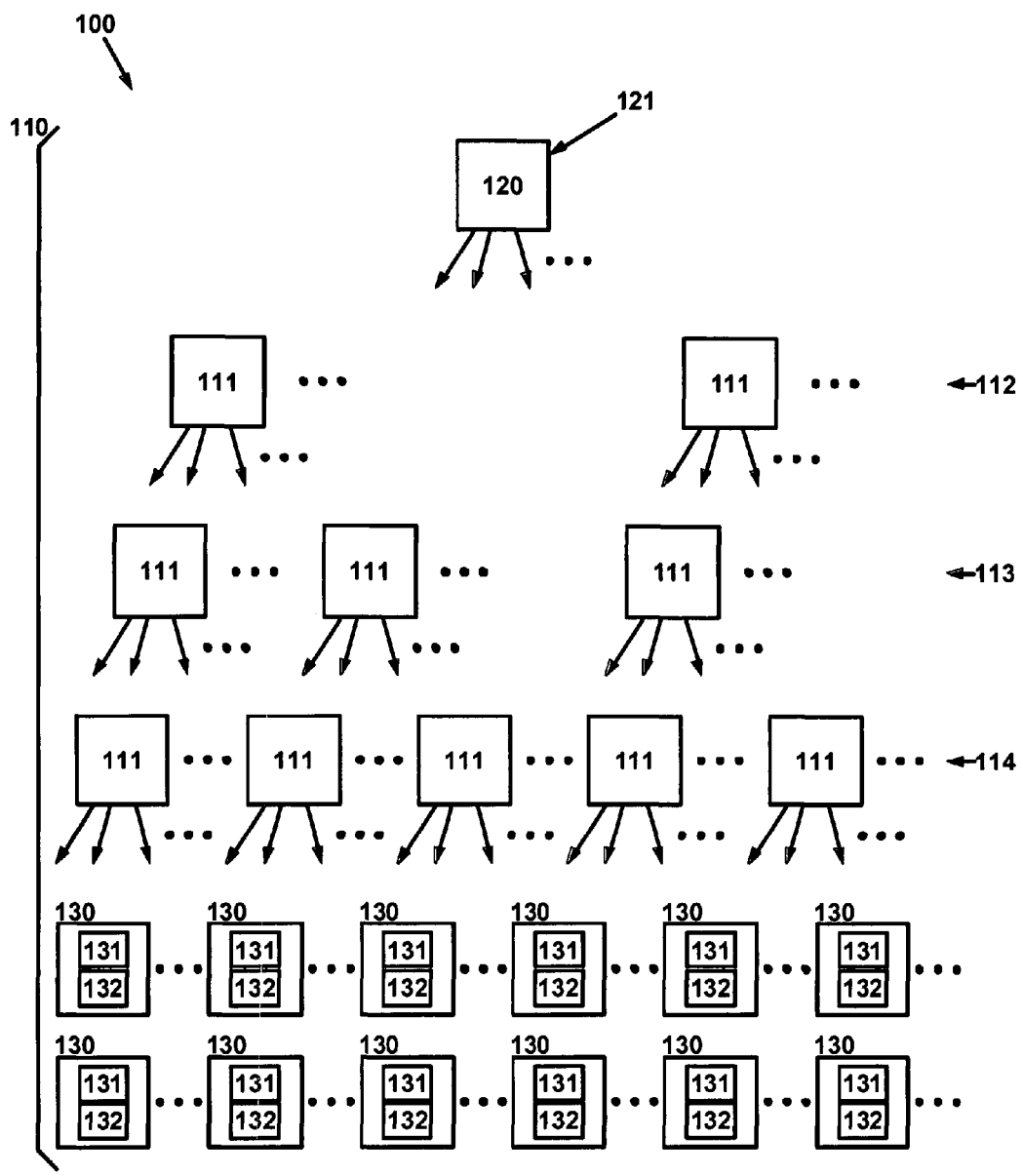
FIG. 1 shows a block diagram of a system for watermarking and fingerprinting digital content.

In the following description, a preferred embodiment of the invention is described with regard to preferred process steps and data structures. Those skilled in the art would recognize after perusal of this application that embodiment of the invention can be implemented using one or more general-purpose processors or special-purpose processors or other circuits adapted to particular process steps and data structures described herein, and that implementation of particular process steps and data structures would not require undue experimentation or further invention.

Lexicography

The following terms refer or relate to aspects of the invention as described below. The descriptions of general meanings of these terms are not intended to be limiting, only illustrative.

The phrase "digital content" describes data in a digital format, intended to represent media streams or other information for presentation to an end viewer. "Digital content" is distinguished from packaging information, such as for example message header information.

The phrase "media stream" describes information intended for presentation in a sequence, such as motion pictures including a sequence of frames or fields, or such as audio including a sequence of sounds. As used herein, the phrase "media stream" has a broader meaning than it's the standard meaning for "streaming media," of sound and pictures that are transmitted continuously using packets and that start to play before all of the content arrives. Rather, as used herein, there is no particular requirement that "media streams" must be delivered continuously. Also as described herein, media streams can refer to other information for presentation, such as for example animation or sound, as well as to still media, such as for example pictures or illustrations, and also to databases and other collections of information.

The phrase "embedding information in media streams" describes generating a set of digital content for that media stream, for which the digital content both represents the media stream and also includes the embedded information in a form capable of later detection.

The term "watermark" describes a schema for digital content by which information can be embedded into that digital content. As described herein, an attacker cannot easily remove the watermark provided by the invention. However, the concept of a watermark as described herein is sufficiently general to include watermarks that are not so resistant to attack. As described herein, the watermark provided by the invention includes within the media stream, both a set of locations at which to embed information, and possible alterations to make at those locations by which information is embedded. However, the concept of a watermark as described herein is sufficiently general to include watermarks using other techniques for embedding information.

The term "fingerprint" describes a specific set of information sufficient to identify at least one designated recipient of digital content. As described herein, multiple attackers colluding together cannot easily remove the fingerprint provided by the invention, or prevent at least one of them from being detected as unauthorized distributor of the digital content. However, the concept of the fingerprint as described herein is sufficiently general to include fingerprints that are not so resistant to removal, or do not provide such capability for detecting unauthorized distributors of the digital content. As described herein, the fingerprint provided by the invention includes within the media stream, a specific set of alterations to make at the locations identified by the watermark. However, the concept of the fingerprint as described herein is sufficiently general to include fingerprints using other techniques for embedding information, detecting the embedded information, and detecting unauthorized distributors of the digital content.

The term "adaptation" describes a process in which a sender delivers digital content to a recipient. As described herein, the sender decrypts its copy of the digital content, embeds information in the media stream represented by that digital content (thus partially fingerprinting that digital content), and re-encrypts that partially fingerprinted digital content. The sender delivers the adapted digital content to the recipient.

The phrase "end viewer" describes a recipient of the media stream for whom decoding of the digital content for the media stream, and presentation of the media stream, is contemplated.

The term "decoding" describes generating data in a form for presentation of the media stream, in response to the digital content for the media stream in an encoded format. As described herein, the encoded format might include an industry standard encoded format such as MPEG-2.

However, the concept of decoding as described herein is sufficiently general to include other encoding formats for the media stream.

The term "presentation" describes generating information in a form for viewing (or other sensing) of the media stream, such as for example audio and visual information for viewing a movie. As described herein, presentation of a movie might include visual display of the frames or fields of motion picture, as well as audio presentation of a soundtrack associated with that motion picture. However, the concept of presentation as described herein is sufficiently general to include a wide variety of other forms of generating information for reception by end viewers, including audio, visual, or otherwise.

The phrases "original movie" and "alt-movie" describe alternative versions of the same media stream, such as one being an original version of that media stream introduced into a system using aspects of the invention, and another being an alternative version of that same media stream generated in response to the original movie. Similarly, the phrases "original block" and "alt-block" describe alternative versions of the same individual block or macroblock within the original movie or alt-movie. As described herein, a difference between the original movie and the alt-movie is historical, in that the alt-movie can be substituted for the original movie in every respect. Similarly, a difference between any one original block and its associated alt-block is historical, in that the alt-block can be substituted for the original block in every respect.

The phrase "MPEG" is an acronym for the "Moving Picture Experts Group," a working group of the ISO/IEC (International Organization for Standardization/International Engineering Consortium). The phrases "MPEG-1," "MPEG-2," and "MPEG-4" refer to techniques for encoding media content as set forth in the ISO/IEC 11172, ISO/IEC 13818, and ISO/IEC 14496 documents, respectively. The invention is not limited to use with MPEG, and these terms should be read broadly to encompass other encoding techniques, whether of similar nature or otherwise.

The term "intra-coded block" refers to a block that is part of an intra-coded macroblock. Intra-coded blocks, and macroblocks are familiar terms in the art of MPEG techniques.

Other and further applications of the invention, including extensions of these terms and concepts, would be clear to those of ordinary skill in the art after perusing this application. These other and further applications are part of the scope and spirit of the invention, and would be clear to those of ordinary skill in the art without further invention or undue experimentation.

System Elements

FIG. 1 shows a block diagram of a system for watermarking and fingerprinting digital content.

System 100 includes video distribution network 110. The video distribution network includes at least one injection origin 120 and a plurality of end viewer premises 130.

1. Distribution from the Injection Origin to the End Viewer Premises.

Injection origin 120 receives digital content 121 for media streams from sources outside the video distribution network 110. In a preferred embodiment, these sources might include content producers or content aggregators, such as for example movie production studios, television studios, or radio or television network syndicators. If necessary, injection origin 120 formats digital content 121, watermarks it, and encrypts it for storage at injection origin 120. In a preferred embodiment, injection origin 120 uses a method of watermarking and fingerprinting as described herein.

In a preferred embodiment, injection origin 120 includes at least a processor capable of executing instructions, memory for storing digital content and instructions, and a network interface.

Video distribution network 110 includes network of caching devices 111, each capable of acting individually or in concert, to receive, store, and distribute digital content 121 from injection origin 120 to end viewer premises 130. In a preferred embodiment, requests from end viewers prompt video distribution network 110 to distribute digital content 121 to end viewer premises 130, thus using a "pull" model for distribution. However, in alternative embodiments, injection origin 120 or another device may prompt video distribution network 110 to distribute digital content 121 to end viewer premises 130, thus alternatively using a "push" model or another model for distribution.

In a preferred embodiment, caching devices 111 are disposed in a tiered distribution system, including primary caches 112, intermediate caches 113, and leaf caches 114. The primary caches 112 receive digital content 121 directly from injection origin 120. Intermediate caches 113 receive digital content 121 from primary caches 112, or from other intermediate caches 113 closer by the network topology to injection origin 120. Leaf caches 114 receive digital content 121 from intermediate caches 113, or possibly directly from primary caches 112, and distribute digital content 121 directly to end viewer premises 130.

Preferably (i.e., in a preferred embodiment), each of the caching devices and end viewer premises includes at least a processor capable of executing instructions, memory for storing digital content and instructions, and a network interface.

In a preferred embodiment, video distribution network 110 includes a redundant communication network, such as the Internet or a secure subnet thereof. However, in the context of the invention there is no particular requirement for video distribution network 110 to use any particular communication technique. In alternative embodiments, any communication technique capable of delivering copies of digital content 121 from injection origin 120, through video distribution network 110, and ultimately to end viewer premises 130, would also be suitable.

Distribution of digital content 121 using video distribution network 110 in a preferred embodiment provides that copies of digital content 121 might be recorded and maintained at multiple caching devices 111, and might be delivered using more than one pathway from injection origin 120 to end viewer premises 130.

For a first example, copies of the digital content 121 might be delivered from the injection origin 120 to two different intermediate caches 113 (A and B), and from those intermediate caches 113 (A and B) to multiple end viewer premises 130. In the event that one of those intermediate caches 113 (A) later discards its copy of the digital content 121, it can receive another copy from the other intermediate cache 113 (B) for further delivery to end viewer premises 130.

For a second example, different portions of the digital content 121 might be delivered from the injection origin 120 to different intermediate caches 113 (A and B), and from those intermediate caches 113 (A and B) to the same end viewer premises 130. This might occur if the act of sending the digital content 121 from the injection origin 120 to the end viewer premises 130 was interrupted, such as for example by a communication link failure within the video distribution network 110 or alternatively by user action, and was later resumed and completed.

2. Distribution to Each Recipient Using the Video Distribution Network.

Whenever any sender delivers digital content 121 to any recipient within the video distribution network 110, the sender performs adaptation of the digital content 121 for that recipient. In adaptation, the sender decrypts its copy of the digital content, embeds information in the media stream represented by that digital content by partially fingerprinting that digital content, and re-encrypts that partially fingerprinted digital content.

In a preferred embodiment, adaptation is performed for all recipients, including both caching devices 111 and end viewer premises 130. This would include transfers among caching devices 111, even those the same or similar distance from the injection origin 120. However, in the context of the invention there is no particular requirement for adaptation to be performed for all possible recipients, so that in alternative embodiments, some portion of the video distribution network 110 might transmit the digital content 121 through without decrypting or re-encrypting it.

Preferably, a different key is used for decryption and re-encryption. It is also possible to use different cryptographic schemes for decryption and re-encryption. Alternatively, the same keys, schemes, or both can be used.

As described above, it is therefore possible as a consequence for individual end viewer premises 130 to receive digital content 121 that has been partially fingerprinted for multiple recipients. However, in a preferred embodiment, the method of fingerprinting (such as for example using a technique described in related applications for detecting collusion among multiple recipients of fingerprinted digital content) provides for detecting individual viewers anyway.

When individual end viewer premises 130 receives the encrypted, fingerprinted digital content 121, it records that digital content 121 in local video library 131. Local video library 131 maintains digital content 121 in its encrypted, fingerprinted form for later distribution to one or more playback elements 132. In response to a request by an end viewer, local video library 131 distributes digital content 121 to one or more playback elements 132, at which digital content 121 is substantially simultaneously decrypted and presented to end viewers for viewing.

Further detail of one possible implementation of system 100 is discussed in a related application, "PARALLEL DISTRIBUTION AND FINGERPRINTING OF DIGITAL CONTENT [1004]."

Methods of Operation

Figure 2:
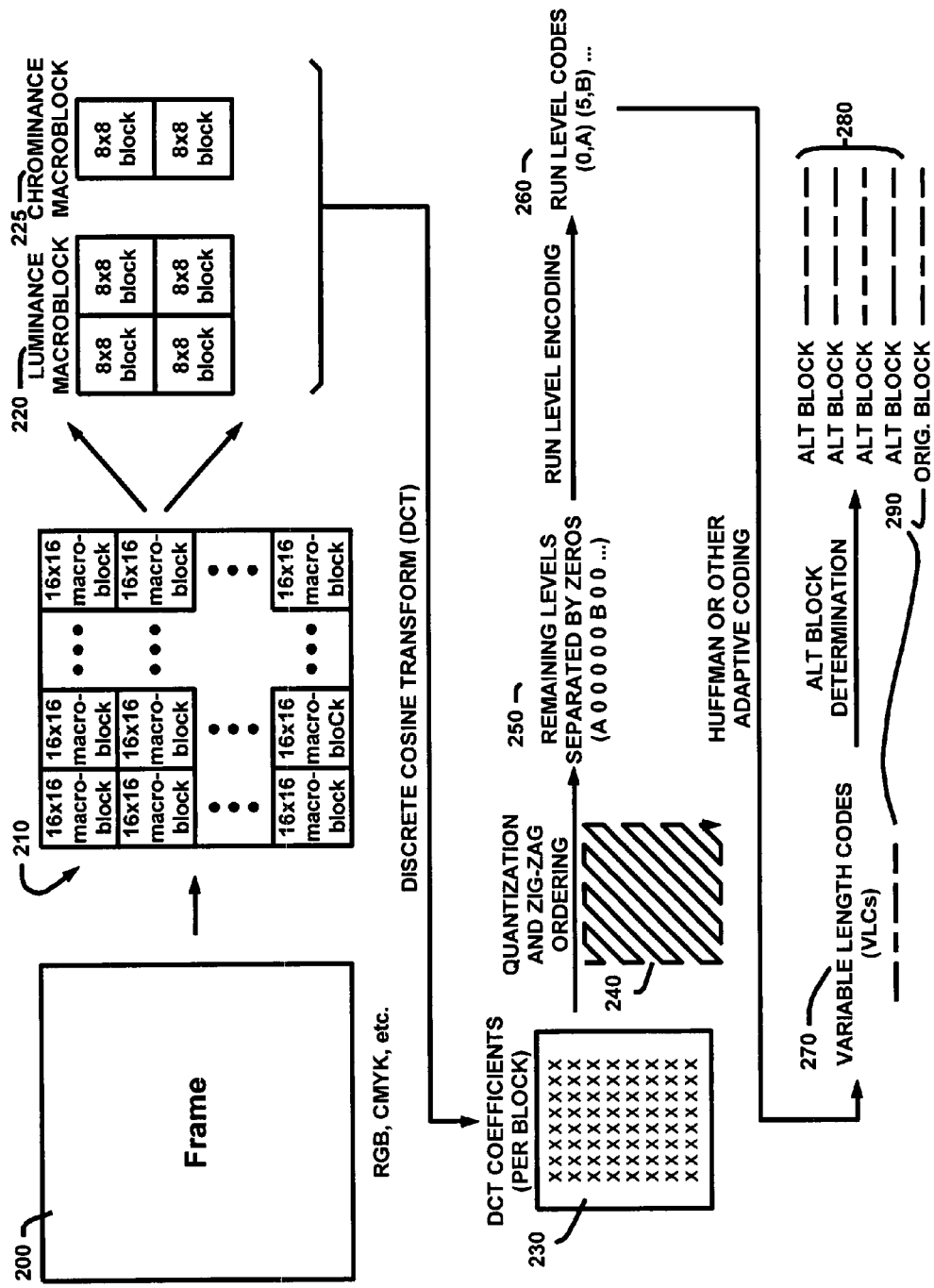
FIG. 2 illustrates MPEG encoding and generation of alt-blocks according to the invention.

FIG. 2 illustrates MPEG encoding and generation of alternative blocks (i.e., alt-blocks) according to the invention. The invention is not limited to use with MPEG encoded digital content. After reading the following discussion of the invention in the MPEG context, one skilled in the art of digital encoding would be able to apply the invention to different encoding schemes and data types without undue experimentation or further invention.

In FIG. 2, frame 200 of digital content is processed according to the MPEG standard. For illustrative purposes, this frame is shown as an image frame in RGB, CMYK, or some other format. The invention is also applicable to other types of digital content.

The data in the frame itself can be processed. If the data in the frame itself is processed, the frame is said to be "intra coded."

Alternatively, the difference of the data from data predicted for the frame can be processed. Prediction of frame data can be based on data in a previous frame or on data in both previous and succeeding frames. In the former case, the frame is said to be a "predictive" frame; in the latter case, the frame is said to be a "bidirectional" frame.

The preferred embodiment of the invention is applied to intra coded frames only; however, such need not be the case.

Frame 200 is divided into 16×16 pixel macroblocks 210. Each macroblock is then decomposed into luminance macroblock 220 and chrominance macroblock 225. FIG. 2 illustrates a 4:2:0 chrominance format. In this format, the luminance macroblock contains four 8×8 blocks, and the chrominance macroblock contains two 8×8 blocks. Lower resolution can be used for the chrominance data because the human eye is less sensitive to chrominance variations than to luminance variations. The chrominance blocks can be determined through any of various downsampling techniques.

In other chrominance formats, different size chrominance macroblocks can be used. For example, in a 4:2:2 format, each chrominance macroblock contains four 8×8 blocks, and in a 4:4:4 format, each chrominance macroblock contains eight 8×8 blocks.

Next, each block of luminance and chrominance data is processed. In order to process a block, a discrete cosine transform (DCT) is applied to the block, resulting in a set of 8×8 DCT coefficients 230.

The DCT coefficients are then quantized. Quantization involves dividing all of the DCT coefficients for a block by an integer and discarding any remainders. The process results in a few non-zero coefficients interspersed among coefficients of zero. The integer by which the coefficients are divided is the quantization level for the block. Quantization results in some loss of precision; however, depending on the degree of quantization permitted, the loss of precision will be acceptable to an end viewer (if noticed at all). The benefit of quantization is that it allows for a high degree of data compression.

The quantized data for a block is then ordered by running through the block in a zig-zag pattern such as pattern 240. This ordering results in a series of non-zero coefficients, called levels, separated by runs of zeros. In FIG. 2, such a series is shown representationally at reference numeral 250.

The series of levels and zeros are converted into a list of pairs of numbers through a process called run level encoding. The pairs of numbers in the list are called run level codes, represented at reference number 260. The first number in each pair represents a number of zeros in a run preceding a level, and the second number in each pair represents the level. Thus, for example, the series of levels and zeros (A 0 0 0 0 0 B 0 0 . . . ) can be converted to the pairs (0,A) and (5,B), etc., with A and B being values for levels.

In order to improve compression, the run level codes are then encoded through some adaptive coding scheme such as a Huffman code. This type of coding scheme results in different length binary codes for each run level code. For this reason, the resulting codes are called variable length codes (VLCs). In FIG. 2, different length VLCs 270 are represented by different length dashes.

VLCs 270 include four dashes representing four variable length codes, which in turn represent four run level codes for quantized DCT coefficients for a single 8×8 pixel block of luminance or chrominance data. A block could be represented by fewer or more such VLCs of shorter or longer length.

As discussed above, the conversion of a frame into VLCs involves downsampling and quantization; as a result, the VLCs do not represent the exact frame data. The invention takes advantage of this fact by determining one or more alternate sets of VLCs for a frame that represent the frame in almost, but not exactly, the same way. These alternate sets of VLCs form alt-blocks according to the invention. The original set of VLCs is referred to as the original block.

Some or all of the VLCs for the alt-blocks might have different lengths than the VLCs in the original block. However, according to the invention, the total length of the VLCs for an alt-block should be equal to the total length of the VLCs for the original block. This is shown representationally in FIG. 2, where the total lengths of the VLCs for alt-blocks 280 are equal to the total length of VLCs 270 for original block 290.

Figure 3:
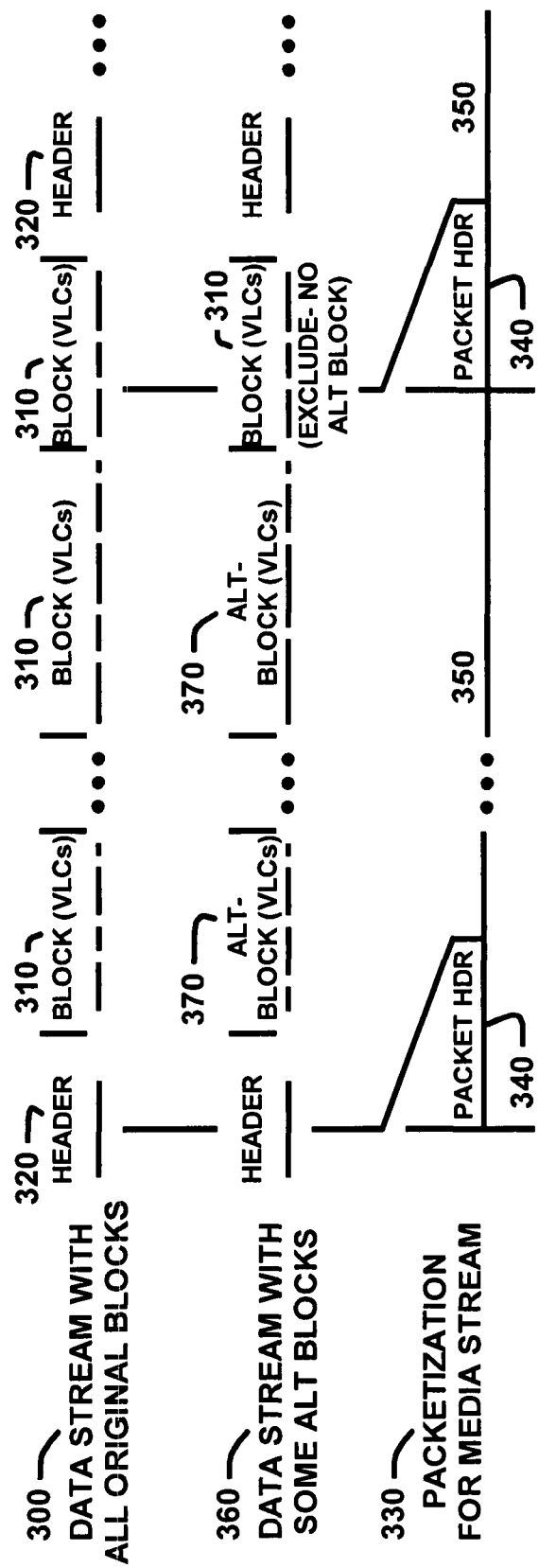
FIG. 3 illustrates preservation of packetization according to the invention.

FIG. 3 illustrates presentation of packetization according to the invention.

In FIG. 3, data stream 300 includes original blocks 310 of VLCs along with control data and the like in headers 320. The variable number and lengths of VLCs in each block are represented by the dashed lines in blocks 310.

Data stream 300 is packetized for presentation as a media stream as packetized data stream 330. The packetized data stream includes its own packet headers 340 and packets 350 including all data from data stream 300. The packet boundaries can occur at any place in data stream 300, as shown in FIG. 3 by vertical lines between packetized data stream 330 and data stream 300. Thus, the packet boundaries can occur in blocks 310 and headers 320.

Data stream 360 includes alt-blocks 370 for some of the blocks in data stream 300. These alt-blocks can be inserted into the data stream in place of the corresponding original blocks in order to embed data in the data stream.

As discussed with respect to FIG. 2, the total length of the VLCs for an alt-block equals the total length of the VLCs for the corresponding original block. However, the number, size, or both of the individual VLCs can vary from those in the original blocks, as long as the overall block lengths are unchanged. These variations are represented by the dashed lines in blocks 370.

Because the length of an alt-block matches the length of its corresponding original block, an alt-block can be substituted into packetized data stream 330 by substituting a packet with the alt-block for the packet with the original block.

However, if an alt-block spans two packets, substitution of the alt-block would require non-trivial look-ahead and analysis of the packetized data stream. Therefore, the preferred embodiment of the invention excludes blocks which span packet boundaries from the possible locations for embedding data. In other words, alt-blocks preferably are not permitted for blocks that span packet boundaries in the packetized data stream.

Specific details of a preferred technique for selecting locations and alt-blocks for those locations are discussed next. The set of possible locations and alt-blocks for a particular item of digital content forms a watermark for that digital content. A copy of the content in which some or all of those possible alt-blocks have been inserted is said to be wholly or partially fingerprinted.

Figure 4:
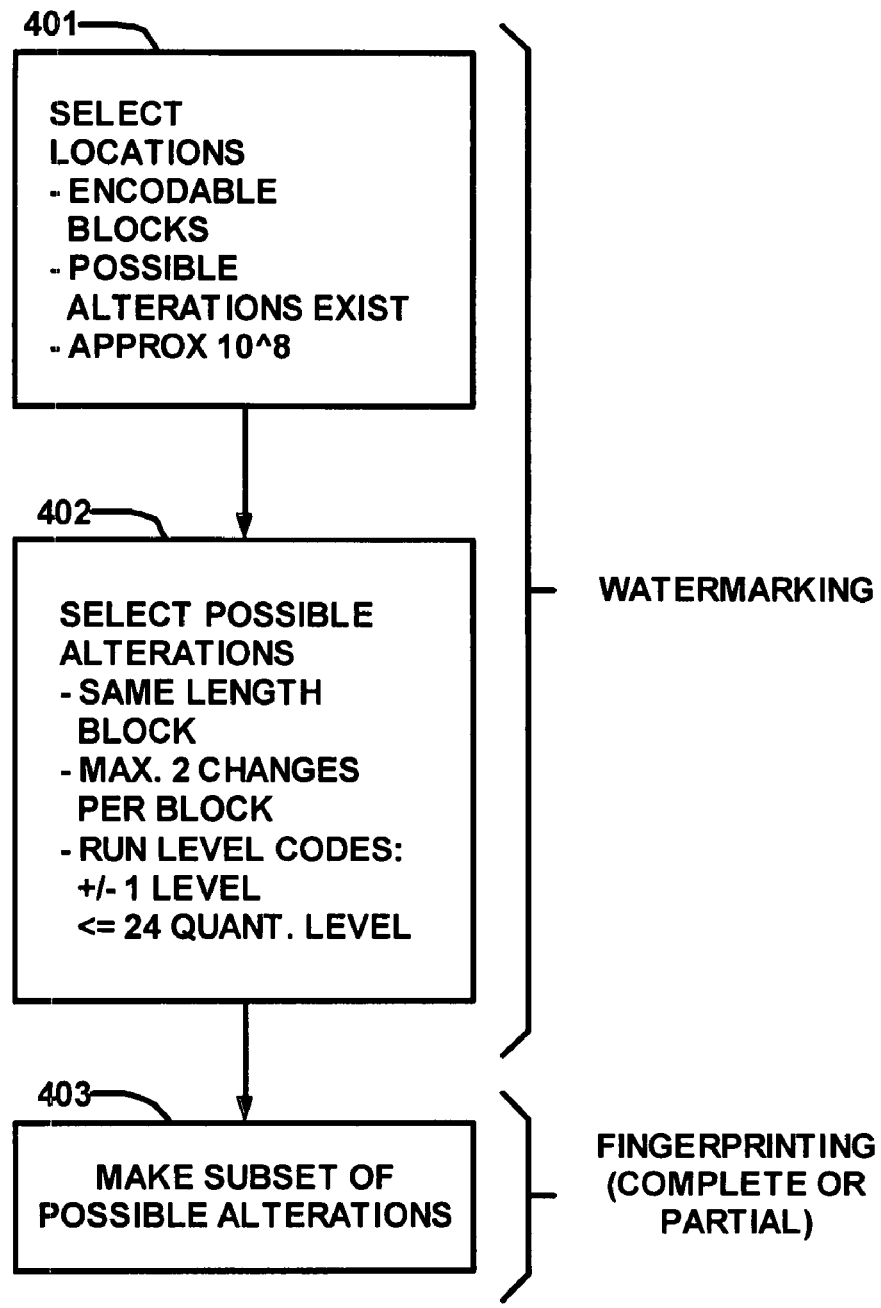
FIG. 4 shows a flow diagram of a method for watermarking and fingerprinting digital content with a set of locations at which information might be embedded.

FIG. 4 shows a flow diagram of a method for watermarking and fingerprinting digital content with a set of locations at which information might be embedded.

1. Watermarking

A set of block locations and alt-blocks at those locations are a specific example of a set of locations and possible alterations in the context of MPEG. In general, a set of such locations and possible alterations at those locations forms a watermark according to the invention. Step 401 and 402 are the steps for creating this watermark. Preferably, these steps are performed at injection origin 120.

In step 401, locations for embedding information are selected in digital content. In the preferred embodiment, this digital content can be an MPEG-1, MPEG-2, or MPEG-4 (collectively referred to as simply MPEG hereinafter) encoded digital movie. The following steps are described in the context of an encoded digital movie. However, the invention is equally applicable to other digital content, and application of these steps would not require further invention or undue experimentation.

The locations are preferably 8×8 blocks of either luminance and chrominance DCT coefficients, but could also be 16×16 macroblocks of such coefficients. Preferably, the locations are blocks of intra coded macroblocks, although the invention can also be used with locations that are complete intra coded macroblocks. Blocks and intra coded macroblocks are well known in the art of MPEG encoding.

The invention also can be applied to other blocks that contain coefficients from transforms other than DCT, for example wavelets or any other transform in which luminance or chrominance information is presented in some transformed domain (e.g., in a non-MPEG encoding scheme), or to transforms of RGB data, CMYK data, YUV data, and more generally, to any transform in which information useful for presentation of the media stream is represented in the digital content. Those skilled in the art, after perusal of this application, would recognize that essentially any combination of color space and basis functions would be workable, is within the scope and spirit of the invention, and would not require undue experimentation or further invention.

In the case of packetized digital content, blocks that span packet boundaries preferably are excluded as possible locations for embedding information.

The locations are also selected such that alternative versions of the blocks exist that meet the criteria discussed in step 402 for selecting possible alterations for the locations. Thus, step 401 preferably occurs in conjunction with step 402.

In step 402, possible alterations to the block are selected. In order to maintain packetization and synchronization of the digital content, these alterations preferably do not involve any change to the length of the digital content at the locations (i.e., blocks) where information is embedded.

In the MPEG context, each block has a set of run-level encoded values for discrete cosine transform (DCT) coefficients for that block. The invention determines if there is an alternative set of values which differ only a little from the original set of values, and which do not change the bit-length of the encoded block. Each such block thus provides both a location to embed information and an alteration for that location, and thus provides at least one bit worth of embeddable information. In an alternative embodiment, macroblocks are used instead of blocks.

In more detail, in MPEG, chrominance and luminance blocks are encoded using variable length codes (VLCs) corresponding to run level codes that represent discrete cosine transforms of pixel data values. These VLCs are Huffman codes that provide an extremely efficient way to compress data. However, the resulting data for different blocks can be different lengths.

Thus, in order to maintain constant block length at a location for embedding information, any changes to the VLCs for the block must result in a net length difference of zero. This can be accomplished in several ways.

First, one VLC could be substituted for another VLC that has the same length. Second, more than one VLC could be substituted for an equal number of VLCs, with the sums of the lengths of the original and substituted VLCs being equal. For example, two VLCs with length 5 and 6 could be substituted for VLCs with lengths 4 and 7. Third, one or more VLCs could be added or deleted. In order to reduce visible impact, additions and deletions preferably are restricted to VLCs with a level of one. Combinations of these three techniques, as well as other techniques, can be utilized.

If more than two VLCs for a block are changed, artifacts can result that might be seen by viewers, albeit at possibly a very low level of perception. Therefore, alt-blocks preferably are limited to blocks resulting from two changes to VLCs.

In order to limit the visible impact on the presentation of the digital content, changes to the data at the identified locations preferably are increases or decreases by a value of one level in the run level codes. In addition, MPEG involves quantization of data represented by the run level codes. If the quantization scale (QS) is higher than 24, even a level change of one can result in unacceptable distortion of the presentation. Thus, only blocks with a quantization scale of less than or equal to 24 preferably are used to form alt-blocks.

In sum, in the preferred embodiment, the following criteria are used to identify a possible alteration (i.e., alt-block) for an original block:

the block is part of an intra coded macroblock the block includes one or two run level codes that can be changed by a value of plus or minus one level, with the change(s) in run level(s) resulting in VLC(s) that have a same length as the VLC(s) for the unchanged levels (if two run level codes are changed, only the sums of the lengths of the VLCs need to be equal)

the quantization scale of the block is less than or equal to 24

Experimentally, a typical MPEG-encoded digital movie has been found to include approximately one hundred million suitable locations that meet these criteria.

While use of the foregoing criteria is the preferred embodiment, the invention is not limited to these criteria. Thus, alternative embodiments of the invention can create alt-blocks from any types of blocks including blocks contained within macroblocks which are not intra coded, can change, add, or delete more than two VLCs in a block, can use changes in levels that are greater than one level, and can create alt-blocks from blocks with quantization scales greater than 24. Other variations are possible without departing from the scope of the invention.

Figure 5:
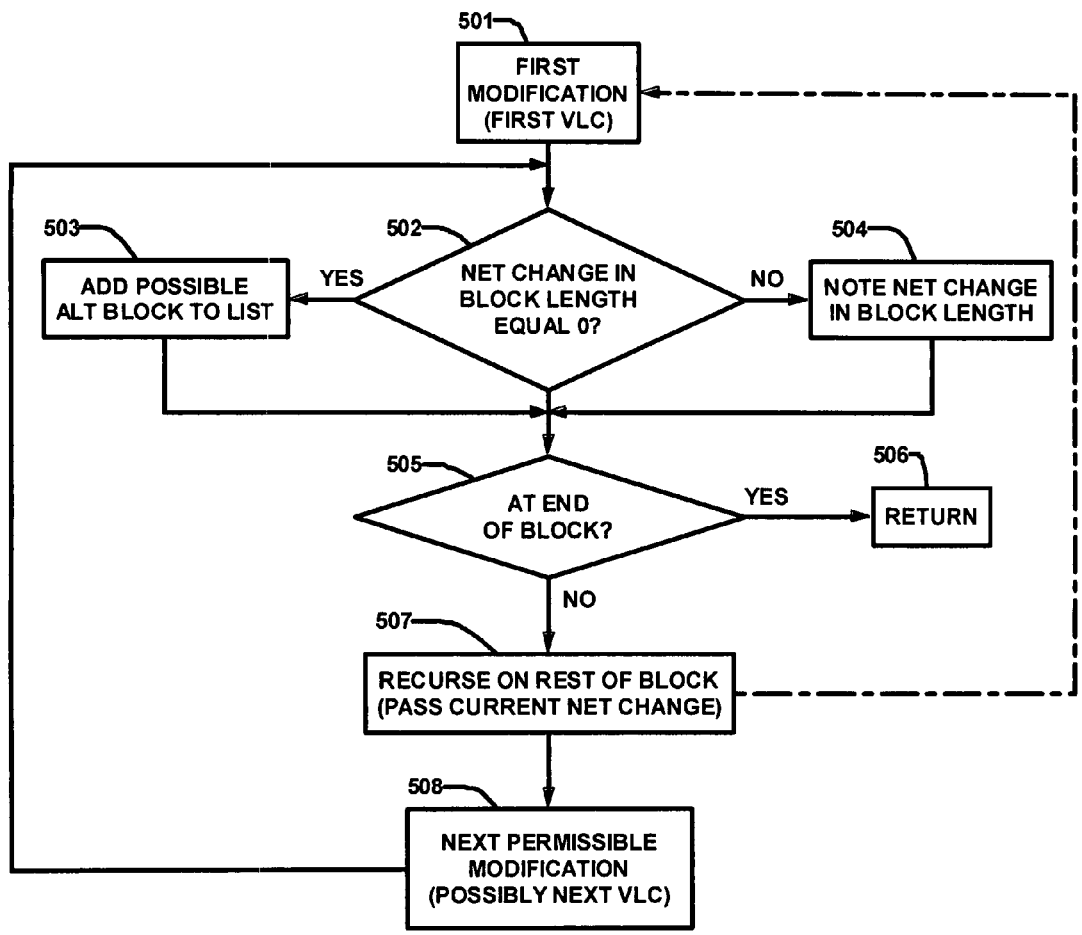
FIG. 5 shows a flow diagram of a recursive technique that can be used to identify possible alterations in a block for determining alt-blocks according to the invention.

FIG. 5 shows a flow diagram of a recursive technique that can be used to identify possible alterations in a block in step 402 for determining alt-blocks. Other different techniques, including non-recursive techniques, can be used in performing step 402 without departing from the invention.

In a recursive technique, an initial process is started that in turn calls another instance of itself. The called instances of the process can then also call other instances of the process, etc. In FIG. 5, the recursive call is shown as a dashed line.

The initial process makes a first permissible modification of a VLC for a block in step 501. A modification of a VLC is permissible if it meets the criteria for quantization level and any other requirements established for modifications to VLCs. Then, in step 502, the process checks to see if the net change in length of the modified VLCs for the block is zero. If the net change (including changes from modifications in any calling recursive processes) is zero, a possible alt-block has been found. The possible alt-block is added to a list of possible alt-blocks in step 503. If the net change is not zero, the change is noted in step 504.

The process recursively calls another instance of itself in step 507, passing on the net change up to that point. The recursively called process starts from the next possible modification of a VLC for the block. This next modification might be another modification of the first or current VLC or a modification of the next VLC.

The processes continue to make recursive calls until the end of the block is reached. When the end of the block is reached by one of the processes, flow for that process is diverted by step 505 to step 506, where the recursive process returns. At this point, the process that called the returning process continues at step 508, where a next permissible modification of the VLCs in the block is made. This entire recursive process continues until the initial process reaches the end of the block.

An example is useful for understanding the foregoing recursive process. In this example, only two changes are tried for each of three VLCs for a block. In order to simplify the example, all modifications are assumed to be permissible. These changes are denoted A+1, A−1, B+1, B−1, C+1, and C−1. In this example, the following orders of VLC modifications are checked for net length changes of zero: (A+1), (A+1, B+1), (A+1, B+1, C+1), (A+1, B+1, C−1), (A+1, B−1), (A+1, B−1, C+1), (A+1, B−1, C−1), (A+1, C+1), (A+1, C−1), (A−1), (A−1, B+1), (A−1, B+1, C+1), (A−1, B+1, C−1), (A−1, B−1), (A−1, B−1, C+1), (A−1, B−1, C−1), (A−1, C+1), (A−1, C−1), (B+1), (B+1, C+1), (B+1, C−1), (B−1), (B−1, C+1), (B−1, C−1), (C+1), and (C−1).

The recursive technique of FIG. 5 can be used to find all possible alt-blocks for a given block. However, in alternative embodiments, the technique could be stopped once a certain number of possible alt-blocks have been found, or even once a single alt-block has been found. If more than one possible alt-block has been found, one or more alt-blocks could be selected from the possible alt-blocks, for example pseudorandomly. Other variations are possible and remain within the scope of the invention.

2. Fingerprinting

Returning to FIG. 4, fingerprinting is performed in step 403. Fingerprinting is the process of actually making some of the alterations at the selected locations in order to embed information in the digital content. In the MPEG context, alterations are made by using alt-blocks in place of some original blocks.

If one alt-block is found for a block, that alt-block can be used to embed one bit at that location. For example, once the set of locations and possible alterations are defined, a "0" can be embedded at a location by using an original block at that location, and a "1" can be embedded by using an alt-block at the location. Other schemes for embedding the data also can be used.

Furthermore, if more than one alt-block is found for a block at a selected location, those alt-blocks can be used to embed more than one bit at that location. For example, the original block could represent "00," a first alt-block could represent "01," a second alt-block could represent "10," and a third alt-block could represent "11." Again, other schemes for using multiple alt-blocks are possible.

In step 403, information (i.e., bits) are embedded in the digital content by substituting alt-blocks for original blocks at some of the selected locations in the digital content. Preferably, only a subset of the locations are subject to change at each of plural different points in distribution of the digital content. For example, a first subset can be subject to change at primary caches 112, a second subset can be subject to change at intermediate caches 113, a third subset can be subject to change at leaf caches 114, etc. Typically, not all of the locations in each subset will be altered because at least some "0s" (or other values depending on the coding scheme) will be embedded at the available locations.

3. Extracting Fingerprint Information

Figure 6:
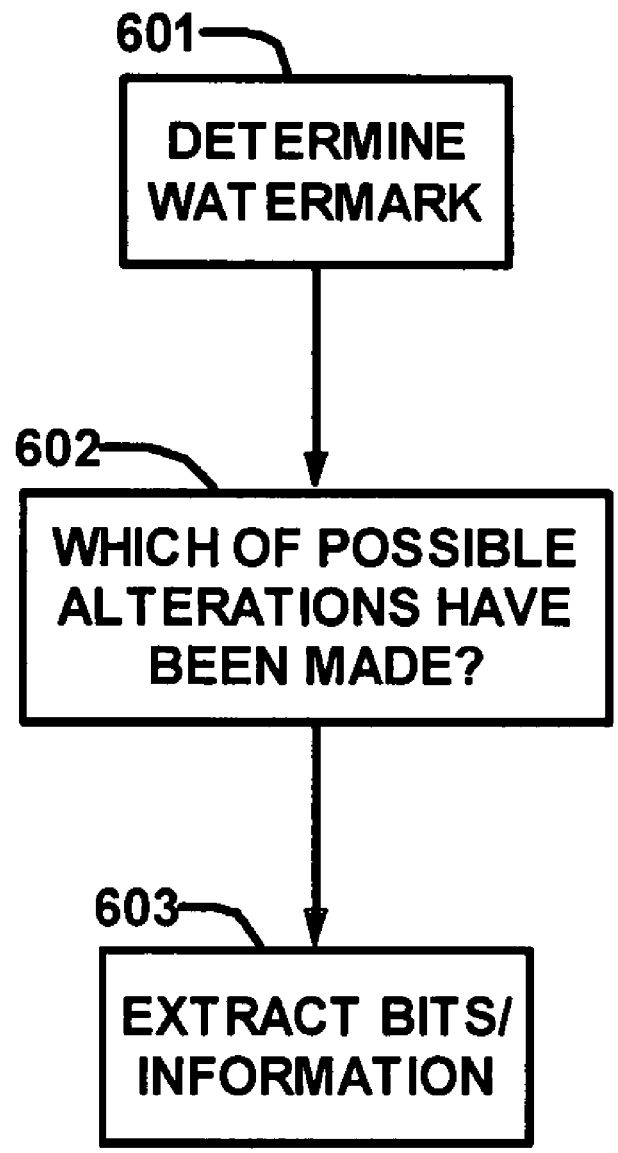
FIG. 6 shows a flow diagram of a method for detecting a fingerprint that embeds information in digital content.

Fingerprinting is only meaningful if the embedded information can be extracted. FIG. 6 shows a flow diagram of a method for extracting embedded information from a fingerprint in digital content. The data can be extracted at computing device that can perform the steps shown in FIG. 6. Such a computing device preferably includes at least a processor and a memory for storing the digital content and for storing instructions for performing the steps.

In step 601, a watermark for a specific item of digital content is determined. This watermark includes a set of locations and possible alterations (e.g., alt-blocks) at those locations for the specific item of digital content.

The watermark itself preferably is not included with digital content that is distributed to end users. Therefore, the watermark preferably is retrieved from injection point 120 based on identifying information about the digital content. Examples of such identifying information include the content's title, revision number, serial number, and the like.

The identifying information preferably is itself embedded in the digital content in some robust fashion or is self-evident from the digital content. For example, in the case of an MPEG encoded movie, the identifying information could be the title of the movie, which would be self-evident from the content of the movie. Other identifying information can be utilized.

Once the watermark is retrieved, the selected locations for embedding information defined by the watermark can be examined in step 602. The locations are examined so as to determine which of the locations have been altered in accordance with the possible alterations specified by the watermark.

Next, in step 603, the embedded information can be extracted from an examination of which alterations (e.g., alt-blocks) are or are not present. For example, alterations that are present can represent digital "1s," and alterations that are not present can represent digital "0s." Other encoding schemes can be used without departing from the invention.

Preferably, each embedded bit of information is embedded many times in the digital content. Thus, loss or corruption of the alterations at some of the locations will not result in loss of embedded information.

In addition, the order of the locations in the digital content preferably is related to the order of bits in the embedded information in some known but random (or pseudorandom) fashion. This scrambling of the embedded information helps prevent unauthorized access to or corruption of the embedded information.

The digital content that is being examined might have been altered, either intentionally or unintentionally. As a result, any given block in the digital content might not exactly match either an original block or an alt-block from the content's watermark. In order to address this issue, the distance of each block from the corresponding original block in some vector space, for example a vector space of DCT coefficients derived from VLCs, could be calculated. Then, blocks that are within some distance of an original block or an alt-block could be deemed to match those blocks. If each bit of embedded data is embedded multiple times, enough bits are likely to be extracted in order to calculate the embedded data.

The following other related applications discuss various techniques for utilizing the watermarking and fingerprinting techniques discussed herein, including further details on how embedded information is organized in the digital content. Each of these applications also is hereby incorporated by reference as if fully set forth herein:

U.S. provisional application 60/394,630, filed Jul. 9, 2002, in the name of inventors Michael A Malcolm, Stephen Watson, Daniel A Collens, and Kevin Hui, titled "Watermarking and Fingerprinting a Movie for Secure Distribution."

U.S. provisional application 60/394,922, filed Jul. 9, 2002, in the name of inventors Michael A Malcolm, Stephen Watson, and Daniel A Collens, titled "System Architecture of a System for Secure Distribution of Media."

U.S. provisional application 60/394,588, filed Jul. 9, 2002, in the name of inventors Michael A Malcolm and Daniel A Collens, titled "Topology of Caching Nodes in a System for Secure Delivery of Media Content."

U.S. provisional patent application 60/444,012, filed Jan. 31, 2003, in the name of Michael Malcolm, Stephen Watson, and Daniel Collens, titled "Watermarking and Fingerprinting a Movie for Secure Distribution."

U.S. patent application Ser. No. 10/356,692, filed Jan. 31, 2003, in the name of inventors Daniel Collens, Stephen Watson, and Michael Malcom, titled "Parallel Distribution and Fingerprinting of Digital Content."

Generality of the Invention

The generation of alt-blocks is not dependent upon the type of encoding used for the digital content. In a general sense, the watermarking and fingerprinting techniques of the invention can be applied to any digital data that models a continuous or analog physical process. The invention can be applied to digitized audio data, measurement data, video data, other multimedia data, and the like, whether encoded by MPEG, some variation of MPEG that may or may not use Huffman coding, or some other entirely different encoding scheme. With any of this digitized data, the techniques of the invention can be used to select locations in the digital content and to select possible alterations to make at the selected locations so as to embed data, all while preserving packetization of the data.

Furthermore, the invention is useful for, and has sufficient generality for, applications other than distribution of media streams, and other than distribution of digital content. For example, the invention is also generally useful for applications in which security of datasets or identifying recipients of those datasets is desired.

Thus, although preferred embodiments are disclosed herein, many variations are possible which remain within the concept, scope, and spirit of the invention. These variations would become clear to those skilled in the art after perusal of this application.

The invention claimed is:

1. A method of presentation of digital content comprising:
    selecting among more than one possible set of presentation possibilities in a media stream;
    wherein said selection includes more than zero markers indicating possible choices among more than one possible presentation, with the possible choices if made individually possibly not preserving packetization, but with the possible choices collectively preserving packetization of the digital content,
    wherein the method is performed by one or more computing devices.

2. The method of claim 1 wherein the more than zero markers indicating choices among more than one possible presentation include at least one alteration that individually would change the length of a packet.

3. The method of claim 1 wherein the selection among more than one possible presentation is at selected locations including blocks in which data can be embedded, and wherein at least one such block includes at least two such possible alterations.

4. The method of claim 3 wherein each of the possible choices, when applied to a presentable block, selects an equivalent block length for the presentable block.

5. The method of claim 1 including providing a complete or partial fingerprint including information representing actual choices selected for more than zero of the selected locations.

6. The method of claim 4 wherein the selections among more than one possible presentation are made at a plurality of different client, server, or cache devices.

7. A method of generating fingerprinted digital content, comprising:
- determining a set of encoded blocks within encoded digital content where data may be embedded;
- identifying a plurality of possible alt-blocks, each of said plurality of possible alt-blocks associated with an encoded block from said set of encoded blocks, wherein each possible alt-block comprises a plurality of alterations in variable length codes (VLCs) of an associated encoded block, wherein a first alteration results in a change in bit-length of an associated VLC, and wherein said possible alt-block comprises a bit-length equal to said encoded block; and
- embedding a fingerprint in said digital content by selecting a first subset of alt-blocks from said plurality of possible alt-blocks, and inserting said first subset of alt-blocks into said digital content in place of a plurality of encoded blocks associated with said first subset of alt-blocks.

8. The method of claim 7, wherein said encoded block comprises an intra coded macroblock.

9. The method of claim 7, wherein a quantization scale of said encoded block is less than or equal to 24.

10. The method of claim 7, wherein more than one of said plurality of possible alt-blocks is associated with said encoded block.

11. The method of claim 7, further comprising:
- replacing an original packet, comprising said encoded block, with an alt-packet, comprising one of the plurality of possible alt-blocks, in a data stream.

12. The method of claim 7, wherein said determining excludes a block, said block spanning packet boundaries in a packetized data stream.

13. The method of claim 7, wherein said fingerprint comprises a plurality of bits of information, each of said plurality of bits of information associated with at least one of said first subset of alt-blocks.

14. The method of claim 7, wherein said embedding further comprises embedding said fingerprint multiple times in said digital content.

15. The method of claim 7, further comprising:
- embedding additional fingerprint information in said digital content by selecting a second subset of alt-blocks from said plurality of possible alt-blocks, and inserting said second subset of alt-blocks into said digital content in place of a plurality of encoded blocks associated with said second subset of alt-blocks.

16. The method of claim 15, wherein said embedding additional fingerprint information is performed at an intermediate cache location in a digital content distribution network.

17. A device for fingerprinting digital content, comprising:
- a network interface over which said digital content can be sent to or received from a network;
- a processor; and
- a memory that stores instructions executable by said processor to fingerprint said digital content, said instructions comprising:
  - determining a set of encoded blocks within encoded digital content where data may be embedded;
  - identifying a plurality of possible alterations, each of said plurality of possible alterations associated with a location from a set of locations, wherein each possible alteration comprises a plurality of alterations at an associated location, wherein a first alteration results in a change in a length of said associated location, and wherein said plurality of alterations results in said possible alteration having said length equal to said associated location; and
  - embedding a fingerprint in said digital content by selecting a subset of possible alterations from said plurality of possible alterations, and inserting said subset of alterations into said digital content in place of a plurality of locations associated with said subset of alterations.

18. The device of claim 17, wherein said device is an injection point for a distribution network for the digital content.

19. The device of claim 17, wherein said embedding is performed at one or more of the following locations: different client; server; and cache devices.

20. The method of claim 17, wherein the digital content is MPEG encoded.

* * * * *